United States Patent Office 3,558,590
Patented Jan. 26, 1971

3,558,590
DERIVATIVES OF 8-LYSINE VASOPRESSIN N-ACYLATED WITH SMALL GLYCINE CONTAINING PEPTIDES
Joseph H. Cort, Karel Jost, Evzen Kasafirek, Josef Rudinger, Frantisek Sorm, and Milan Zaoral, Prague, Czechoslovakia, assignors to Ceskoslovenska Akademie Ved, Prague, Czechoslovakia
No Drawing. Continuation of application Ser. No. 476,189, July 30, 1965. This application July 30, 1968, Ser. No. 754,117
Claims priority, application Czechoslovakia, Aug. 1, 1964, 4,399/64
Int. Cl. A61k 27/00; C07c 103/52; C07d 93/36
U.S. Cl. 260—112.5    5 Claims

ABSTRACT OF THE DISCLOSURE

An anti-shock peptide compound of the general formula

R. Cys. Phe(X). Phe—Glu(NH$_2$). Asp(NH$_2$)Cys. Pro.

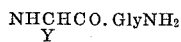

wherein X is H, CH$_3$, CH$_2$CH$_3$, OH or OCH$_3$, Y is an aliphatic chain of a length between 2 and 5 carbons and having a basic group at the end (W), the said basic group being selected from the group consisting of amino, methylamino, dimethylamino and guanidino, R is a peptide chain of 2 to 4 alphaamino acid residues and including at least one glycine, all other of said residues being in L configuration. A preferred compound is N-glycyl-glycyl-8-lysine-vasopressin. The compounds of the invention are made by reducing a peptide of the general formula Z$^1$. R. Cys(Z$^3$). Phe(X).Phe. Glu(NH$_2$). Asp(NH$_2$). Cys(Z$^4$).

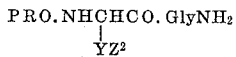

wherein X, Y and R are as above, Z$^1$ and Z$^2$ are protective groups respectively, for the said basic group, of the aliphatic chain and the terminal amino group of the peptide chain. and Z$^3$ and Z$^4$ are protective groups for SH, the said reaction being carried out with an agent adapted to remove these said protective groups Z$^1$, Z$^2$, Z$^3$ and Z$^4$, followed by oxidizing the resulting compound in an aqueous solution.

---

This is a continuation of application Ser. No. 476,189, filed on July 30, 1965 and now abandoned.

This invention relates to peptides possessing antishock action and being derived from vasopressin and its synthetic analogues. The peptides of the invention have the general formula

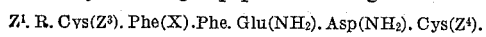

wherein X is H, CH$_3$, CH$_2$CH$_3$, OH or OCH$_3$, Y is an aliphatic chain with 2 to 5 C atoms terminating ($\omega$) in a basic group, such as, NH$_2$ or guanidino, and R is a peptide chain of 2 to 4-alpha-amino acid residues, of which at least one is glycine and all other are in the L configuration.

In the pharmacological treatment of shock there are employed at the present time catecholamines or such peptides as angiotension (hypertensin). All of these substances share the disadvantage that the increase in arterial perfusion pressure is achieved by virtue of arterial vasoconstriction, so that the increased peripheral resistance actually decreases peripheral blood flow, thus worsening the peripheral metabolic sequelae of shock. Moreover, these compounds have a very short period of action, have to be administered by infusion, and if the latter is interrupted there is an extremely rapid return of the shock state. Some investigators have, for the above reasons, argued against such treatment (Nickerson, M., Shock-Pathogenesis and Therapy, Springer Verlag, Göttingen, 1962, p. 356).

A synthetic analogue of vasopressin, 2-phenyl-alanine-8-lysine vasopressin, when given by infusion to rats after hemorrhage, increases the survival rate after return to the hemorrhaged blood (Hershey, S. G., Massa, V.D.B., Gynre, L., Singer K., Proc. Soc. Exp. Biol. Med. 115, 325 (1964)), which effect may be related to the venoconstrictor action observed in cats with the same peptide (Carlotti, A., Weber, H., Weidmann H., Helv. Physiol. Acta 21, 394 (1963)). However, the action of this vasopressin analogue is again only of short duration. The effect of this substance on the hemodynamics in shock conditions is unknown.

It is therefore an object of the invention to provide a long acting anti-shock agent.

A more specific object is an anti-shock agent which is effective for a substantial length of time without decreasing the peripheral blood flow.

A further object is an anti-shock agent which does not require administration by continuous infusion and does not result in collapse of the arterial system upon discontinuance of the infusion.

These and other objects will be apparent from the following description of the invention.

The inventors have found that derivatives of vasopressin and its synthetic analogues, wherein a short peptide chain is attached to the terminal amino group and in which chain glycine is present, have a favorable and long-acting effect when given in small doses, on the hemodynamics of shock. Thus, in dogs in hemorrhagic shock after a 50% blood loss, arterial pressure and cardiac output were raised and oxygen consumption normalized, along with the respective quotient. The action of a dosage of 1–10 $\mu$ g./kg. lasts for 2 or more hours. In normotensive control animals there was a decrease in blood volume in the lower extremities and in the lungs, suggesting that contraction of the capacitance bed may play a part in the anti-shock action. Rats which received a single dose before removal of 25% of blood volume survived more than 12 hours with a normal arterial pressure, whereas in untreated controls there was a high mortality in deep hypotension.

The compounds of the invention may be made by proceeding from peptides of the general formula Z$^1$. R. Cys(Z$^3$). Phe.(X)Phe. Glu(NH$_2$). Asp(NH$_2$). Cys(Z$^4$). Phe.

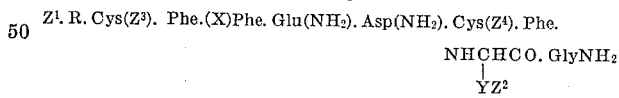

wherein X is H, methyl, ethyl, hydroxyl or methoxyl, Y is an aliphatic chain with 2–5 carbon atoms terminating ($\omega$) in a basic group such as amino or guanidino, R is a peptide chain with 2 to 4 $\alpha$-amino acid residues all of which have an L configuration and at least one of which is glycine and Z$^1$ and Z$^2$ are protective groups for the amino-groups, such as tosyl or benzyloxycarbonyl, and Z$^3$ and Z$^4$ are protective groups for SH such as benzyl. In the process of the invention groups Z$^1$, Z$^2$, Z$^3$ and Z$^4$ are removed by reducing agents and the resulting SH groups are oxidized in an aqueous solution. The peptide reduction is accomplished in liquid ammonia or in amines of alkali metals or rare earth metals. Oxidation of disulfhydryl substances is carried out with air, oxygen, hydrogen, peroxide, ferricyanide or diodoethane.

Because of their favorable effect on the hemodynamics and metabolic parameters in shock these substances may find application, along with other treatments and remedies, in the treatment of hemorrhagic, surgical or cardiogenic shock. The physiological basis of action is desirable, and long-acting effect enables a single dose treatment instead of continuous infusion. This in turn will substantially facilitate, for instance, treatment under field conditions to permit safe transport to the hospital.

EXAMPLE 1

The amide of benzyloxycarbonyl-leucyl-glycyl-glycyl-S-benzylcysteinyl - tyrosyl - phenylalanyl - glutaminyl-asparaginyl-S-benzylcysteinyl-prolyl-$N^\epsilon$-tosyllysyl-glycine To a solution of 0.75 gr. of the hydrazide of benzyloxycarbonyl - leucyl - glycyl-glycyl - S-benzylcysteinyl-tyrosine in 5 ml. dimethylformamide and 1 m. conc. HCl at $-10°$ C., 0.07 gr. of $NaNO_2$ in 1 ml. of water were added. After 5 min. of mixing at $-10°$ C. the pH was adjusted to 6.5–7.5, with N-ethylpiperidine, and then 1.05 gr. of the amide of phenylalanyl-glutaminyl-asparaginyl-S-benzylcysteinyl-prolyl-$N^\epsilon$-tosyl-lysyl-glycine in 5 ml. dimethylformamide were added. The reaction mixture was left for 12 hrs. at 0° C. and then evaporated in vacuo. The residue was triturated with dilute HCl, filtered, and on the filter washed with dilute HCl, 5% $NaHCO_3$ and finally water at 50° C. The unrefined product (1.2 gr.) was crystallized from a mixture of dimethylformamide and water to give a final product of 0.85 gr. (48%) with melting point 188–190° C. For analysis the sample was recrystallized in the same manner with no change in melting point.

$C_{85}H_{108}N_{16}O_{19}S_3$ (1754.0): Calculated (percent): C, 58.20; H, 6.21; N, 12.78. Found (percent): C, 58.18; H, 6.42; N, 12.56.

N-leucyl-glycyl-glycyl-8-lysine-vasopressin 0.5 gr. of the protected dodecapeptide amide was dissolved in liquid ammonia (300 ml., freshly distilled over sodium). Sodium was added in portions over a period of three minutes until a permanent dark blue color appeared. The solution was decolorized by the addition of glacial acetic acid, concentrated and dried from the frozen state. The powder was dissolved in 400 ml. of 5% acetic acid and shaken up five times with peroxide-free ether, then diluted to 500 ml. with water. The pH was adjusted to 6.8–7.0 with ammonium hydroxide and after addition of 1 ml. of 1% ferric chloride air was bubbled through the aqueous solution of the analogue until a negative nitroprussic reaction occurred (20–30 hrs). The pH was then readjusted back to 4–4.5 with acetic acid. This solution of vasopressin can be used directly pharmaceutically, or it can be further purified by counter-current distribution, chromatography on ion-exchangers, etc.

EXAMPLE 2

The ethyl ester of benzyloxycarbonyl-glycyl-glycyl-S-benzylcysteinyl-tyrosine

To a solution of 1.305 gr. of benzyloxycarbonyl-glycine in a mixture of 15 ml. chloroform and 0.7 ml. N-ethyl-piperidine at 0° C. was added sec. butyl chloroformate (0.7 ml.). After 9 min. 2.65 gr. of the hydrobromide of the ethyl ester of glycyl-S-benzylcysteinyl-tyrosine and 0.7 ml. N-ethyl-piperidine in 15 ml. of chloroform were added. After 1 hr. at room temperature the reaction mixture was evaporated in vacuo and the resulting powder dissolved in a mixture of ethyl acetate and water. The organic phase was shaken successively with 1 N HCl, water, 5% $NaHCO_3$ and again with water, and dried with $Na_2SO_4$. The ethyl acetate was drawn off in vacuo. 2.1 gr. (65%) of the product (melting point 137–139° C.) were crystallized from a mixture of ethyl acetate and petroleum ether. For analysis the sample was recrystallized twice in the same manner, with a resulting point of 142–144° C. Empirical formula:

$C_{33}H_{38}N_4O_8S$ (650.7): Calculated (percent): C, 60.91; H, 5.90; N, 8.61. Found (percent): C, 60.86; H, 5.95; N, 8.42.

The hydrazide of benzyloxycarbonyl-glycyl-glycyl-S-benzyl-cysteinyl-tyrosine

To a solution of 1.6 gr. of the ester of tetrapeptideamide in 15 ml. ethanol 2.0 ml. of 64% hydrazine hydrate were added. After 3 days at room temperature the crystalline product was filtered and washed with ethanol and water. The yield of 1.5 gr. (97%) had a melting point of 216–223° C. For analysis the sample was crystallized from dilute ethanol and had a melting point of 228–230° C. Formula:

$C_{31}H_{36}N_6O_7S$ (636.7): Calculated (percent): C, 58.47; H, 5.71; N, 13.19. Found (percent): C, 58.12; H, 5.72; N, 12.92.

The amide of benzyloxycarbonyl-glycyl-glycyl-S-benzyl-cysteinyl - tyrosyl - phenyl-alanyl - glutaminyl-asparaginyl - S-benzyl-cysteinyl - prolyl-N-tosyllysyl-glycine To a solution of 470 mg. of the hydrazide of benzyloxycarbonyl-glycyl-glycyl-S-benzyl-cysteinyl - tyrosine in a mixture of 16 ml. tetrahydrofuran and 3.6 ml. azeotropic HCl at $-15°$ C., 55 mg. of $NaNO_2$ in 0.22 ml. water were added upon constant stirring. After 5 min. the reaction mixture was diluted with pre-cooled ethyl acetate and shaken up with 3% $NaHCO_3$ in aqueous NaCl. The azide solution was rapidly dried with $Na_2SO_4$ at 0° C. and added to a solution of 778 mg. of the amide of phenylalanyl - glutaminyl-asparaginyl - S-benzyl - cysteinyl-prolyl-$N^\epsilon$-tosyllysyl-glycine in 50 ml. of dimethylformamide. The mixture was left at 0° C. for 3 days, evaporated to dryness in vacuo and washed on filter paper with dilute HCl and water. The impure product was precipitated from a mixture of dimethylformamide and water. The final yield was 950 mg. (79%) with a melting point of 211–213° C. For analysis the sample was reprecipitated in the same manner with no change in melting point. Formula:

$C_{79}H_{98}N_{15}O_{18}S_3 \cdot 1H_2O$ (1659.9): Calculated (percent): C, 57.16; H, 6.07; N,12.66. Found (percent): C, 57.26; H, 5.83; N, 12.55.

N-glycyl-glycyl-8-lysine-vasopressin 855 mg. of the protected undecapeptide-amide was dissolved in 250 ml. of liquid ammonia (freshly distilled over Na) and reduced with 300 mg. Na. After decolorizing the solution with 500 mg. of ammonium chloride the peptide was isolated by freeze-sublimation. The lypophilisate was dissolved in 750 ml. of water, the pH was adjusted to 3.5–4.0 and the solution was shaken up with ethyl acetate and ether. The pH was then readjusted to 7.0 and 110 ml. of 0.01 N potassium ferricyanide was added with constant mixing. The aqueous phase was then filtered through a column of Amberlite IR–4B in the chloride cycle and the pH was adjusted to 3.5–4.5. The resulting solution can be used directly in pharmaceutical compositions or the pure substance can be isolated by ion-exchange chromatography using "CH sephadex" (a weak acidic carboxylate ion exchanger) or counter-current distribution.

EXAMPLE 3

The ethyl ester of benzyloxycarbonyl-glycyl-glycyl-glycyl-S-benzylcysteinyl-tyrosine (a) To a solution of the hydrazide of benzyloxycarbonyl-glycyl-glycine (562 mg.) in a mixture of 24 ml. of acetic acid, 9 ml. of ether and 8 ml. of azeotropic HCl at $-15°$ C. were added, with stirring, 150 mg. of $NaNO_2$ in 0.6 ml. water. After 8 min. the reaction mixture was diluted with 30 ml. ethyl acetate and 15 ml. tetrahydrofuran, shaken at $-15°$ C. with 3% $NaHCO_3$ in aqueous NaCl and dried in the usual manner with $Na_2SO_4$. The azide solution was then added to a solution of 940 mg. of the ethyl ester of glycyl-S-benzylcysteinyl-tyrosine in a mixture of 12 ml. ethyl acetate and 12 ml. tetrahydrofuran. After 12 hrs. at 0° C. the reaction mixture was evaporated in vacuo, the powder triturated with dilute HCl and washed on filter paper with dilute HCl and water. Crystallization from isopropanol gave a yield of 990 mg. (70%) with a melting point of 136–137° C. For analysis, the sample was recrystallized in the same manner and showed a melting point of 140–142° C. Formula:

$C_{35}H_{41}N_5O_{12}S$ (707.8): Calculated (percent): C, 59.39; H, 5.84; N, 9.90. Found (percent): C, 59.19; H, 5.87; N, 10.00.

(b) By the mixed anhydride method there was obtained a yield of 60% of a product having a melting point of 137–140° C., No lowering of the melting point occurred on admixture of the sample prepared under (a).

The hydrazide of benzyloxycarbonyl-glycyl-glycyl-glycyl-S-benzylcysteinyl-tyrosine To a solution of 780 mg. of the ester in 15 ml. ethanol 2 ml. of 65% hydrazine hydrate were added. The reaction mixture was boiled for 1 hr. under a reflux condenser and then cooled to 0° C. Crystalline hydrazide was precipitated, filtered and then washed with methanol and water. The yield was 587 mg. (74%) with a melting point of 185–187° C. For analysis the sample was crystallized from dilute methanol. The final product had a melting point of 191–197° C. and the formula:

$C_{33}H_{39}N_7O_{11}S \cdot 1H_2O$ (711.8): Calculated (percent): C, 55.68; H, 5.81; N, 13.76. Found (percent): C, 55.80; H, 5.81; N, 13.76.

The amide of benzyloxycarbonyl-glycyl-glycyl-glycyl-S-benzylcysteinyl - tyrosyl - phenylalanyl - glutaminyl-asparaginyl - S - benzylcysteinyl-prolyl - N' - tosyllysyl-glycine 533 mg. of the hydrazide of benzyloxycarbonyl-glycyl-glycyl-glycyl-S-benzylcysteinyl-tyrosine were dissolved in a mixture of tetrahydrofuran (12 ml.), azeotropic HCl (0.6 ml.) and water (0.2 ml.) The solution was cooled to —15° C. and upon constant stirring 55 mg. of NaNO₂ in 0.22 ml. of water were added. After 8 min. of stirring the solution was diluted with ethyl acetate (30 ml.) and was shaken with 3% NaHCO₃ in aqueous NaCl. After the usual drying procedure with Na₂SO₄ the azide solution was added to a solution of 778 mg. of the amide of phenylalanyl - glutaminyl - asparaginyl-S-benzylcysteinyl-propyl-N^ε-tosyllysyl-glycine in 50 ml. of dimethylformamide. After 12 hrs. at 0° C. the reaction mixture was evaporated in vacuo, and the powder was triturated with dilute HCl, filtered and washed with dilute HCl and water. The yield was 808 mg. (64%). The compound obtained had a melting point of 204–211° C. For analysis the sample was precipitated from an aqueous solution of dimethylformamide, with a final melting point of 210–213° C. Formula:

$C_{81}H_{101}N_{16}O_{19}S_3 \cdot 1H_2O$ (1716.9): Calculated (percent): C, 56.66; H, 6.05; N, 13.06. Found (percent): C, 56.34; H, 6.18; N, 12.80.

N-glycyl-glycyl-glycyl-8-lysine-vasopressin 890 mg. of the protected dodecapeptide-amide was reduced with Na in liquid ammonia. The reaction mixture was processed and the product isolated in a manner similar to that above given for N-glycyl-glycyl-8-lysine-vasopressin.

EXAMPLE 4

The methyl ester of benzyloxycarbonyl-glycyl-glycyl-S-benzylcysteinyl-phenylalanine To a solution of 1.33 gr. of benzyloxycarbonyl-glycine-glycine in 20 ml. of chloroform 0.7 ml. of N-ethylpiperidine were added. The solution was cooled to +5° C. and 0.7 ml. of sec. butyl-chloroformate was added. After 10 min. 2.27 gr. of the hydrobromide of the methyl ester of S-benzylcysteinyl-phenylalanine and 0.7 ml. of N-ethylpiperidine in 20 ml. of chloroform were added. After 30 min. at +5° C. and a further 90 min. at room temperature the reaction mixture was vacuum dried, the powder was dissolved in a mixture of ethyl acetate and water, the organic layer was shaken consecutively with dilute HCl, water, 5% NaHCO₃ and again water, dried with Na₂SO₄ and the ethyl acetate was distilled off under vacuum. Crystallization from a mixture of ethyl acetate and petroleum ether and recrystallization from isopropanol gave a yield of 1.94 gr. of product with a melting point of 112–114° C. For analysis, the sample was recrystallized from isopropanol, with no change in melting point.

$C_{32}H_{36}N_4O_7S$ (620.7): Calculated (percent): C, 61.92; H, 5.85; N, 9.03. Found (percent): C, 62.12; H, 6.25; N, 8.82.

Benzyloxycarbonyl-glycyl-glycyl-S-benzylcysteinyl-phenylalanine-hydrazide

To a solution of 1.27 gr. of benzyloxycarbonyltetrapeptide ester in a mixture of 30 ml. methanol and 5 ml. water 3 ml. of 65% hydrazine hydrate were added. The reaction mixture was boiled for 1 hr. under a reflux condenser. After cooling to 0° C. the hydrazide crystals were removed by suction and were washed with water. The yield was 0.96 gr. (76%), of melting point 185–188° C. For analysis, the sample was crystallized from dilute methanol, and had a melting point of 181–186° C. Formula:

$C_{31}H_{36}N_6O_6S$ (620.7): Calculated (percent): C, 59.98; H, 5.85; N, 13.54. Found (percent): C, 59.50; H, 5.92; N, 13.47.

Benzyloxycarbonyl - glycyl-glycyl-S-benzylcysteinyl-phenylalanyl-phenylalanyl - glutaminyl - asparaginyl-S-benzylcysteinyl-propyl-N-tosyllysyl-glycine-amide The azide of benzyloxycarbonyl-glycyl-glycyl-S-benzylcysteinyl-phenylalanine was prepared from the corresponding hydrazide (465 mg.) as in Example 2. Condensation with heptapeptide-amide (778 mg.) and precipitation from aqueous dimethylformamide gave a yield of 760 mg. (58%) with a melting point of 212–220° C. For analysis, the sample was precipitated in the same manner as in Example 2 giving a melting point of 212–219° C. Formula:

$C_{79}H_{98}N_{15}O_{17}S_3 \cdot 1H_2O$ (1643.9): Calculated (percent): C, 57.71; H, 6.17; N, 12.78. Found (percent): C, 57.85; H, 6.12; N, 12.40.

N-glycyl-glycyl-2-phenylalanine-8-lysine-vasopressin

The protected undecapeptide-amide was reduced with Na in liquid ammonia. The analogue was oxidized with aqueous ferricyanide and further processed as in the case of N-glycyl-glycyl-8-lysine-vasopressin.

What we claim is:

1. A peptide selected from the group consisting of N-R-8-lysine-vasopressin and N-R-2-L - phenylalanine-8-lysine-vasopressin wherein R is a peptide chain of 2 to 4 α-amino acid residues selected from the group consisting of glycyl and leucyl, at least one of said residues being glycyl, and all amino acid residues other than glycyl being of the L-configuration.

2. The peptide compound of claim 1 which is N-glycyl-glycyl-8-lysine-vasopressin.

3. The peptite compound of claim 1 which is N-glycyl-glycyl-glycyl-8-lysine-vasopressin.

4. The peptite compound of claim 1 which is N-glycyl-glycyl-2-L-phenylalanine-8-lysine-vasopressin.

5. The peptite compound of claim 1 which is N-L-leucyl-glycyl-glycyl-8-lysine-vasopressin.

(References on following page)

References Cited

UNITED STATES PATENTS 3,232,923  2/1966  Boissonnas et al. ___ 260—112.5

OTHER REFERENCES

Cort et al.: Lancet, 1964 II, pp. 840–841.

Jost et al.: Coll. Czech. Chem. Commun. 28, pp. 2021–2030 (1963).

Rudinger et al.: ed., Oxytocin, Vasopressin and Their Structural Analogues, Proceedings of the Second International Pharmacology Meeting, Prague, 1963, MacMillan Company, New York (1964), pp. 12–17, 167–171, and 181–183.

Zaoral et al.: Coll. Czech. Chem. Commun. 28, pp. 747–749 (1963).

LEWIS GOTTS, Primary Examiner

M. KASSENOFF, Assistant Examiner

U.S. Cl. X.R.

424—177